United States Patent [19]

Lewis, Jr.

[11] 4,185,905
[45] Jan. 29, 1980

[54] DUAL PURPOSE FLASH/STROBE SOCKET ASSEMBLY FOR A PHOTOGRAPHIC CAMERA

[75] Inventor: John A. Lewis, Jr., Stoneham, Mass.

[73] Assignee: Polaroid Corporation, Cambridge, Mass.

[21] Appl. No.: 892,493

[22] Filed: Apr. 3, 1978

[51] Int. Cl.² ...................... G03B 15/03; G03B 15/05
[52] U.S. Cl. ..................................... 354/141; 354/145
[58] Field of Search .................. 354/32, 35, 126, 132, 354/141, 145, 148, 149, 288; 362/3, 4, 11, 13, 12; 339/14 R

[56] References Cited

U.S. PATENT DOCUMENTS

| 3,441,896 | 8/1969 | Hawkins | 339/14 |
| 3,463,069 | 8/1969 | Kremp | 354/141 |
| 3,487,351 | 12/1969 | Schmidt | 339/33 |
| 3,521,540 | 5/1970 | Cavallo | 354/141 |
| 3,731,605 | 5/1973 | Kitagawa | 354/141 |
| 3,748,980 | 7/1973 | Brandt et al. | 354/148 |
| 3,748,985 | 7/1973 | Brandt | 362/11 |
| 3,757,643 | 9/1973 | Burgarella | 354/143 |
| 3,809,878 | 5/1974 | Brandt | 354/141 |
| 3,858,227 | 12/1974 | Ellin et al. | 354/145 |
| 3,969,737 | 7/1976 | Kendrick | 354/141 |
| 4,025,933 | 5/1977 | Bing | 354/141 |
| 4,064,519 | 12/1977 | Kee | 354/141 |

FOREIGN PATENT DOCUMENTS

| 2144769 | 12/1973 | Fed. Rep. of Germany | 354/141 |
| 1512965 | 3/1967 | France | 354/132 |

Primary Examiner—L. T. Hix
Assistant Examiner—Thomas H. Tarcza
Attorney, Agent, or Firm—Francis J. Caufield

[57] ABSTRACT

A dual purpose socket assembly is provided for a photographic camera for releasably connecting either a photoflash lamp device or an electronic flash device to the camera which operates in an artificial illumination mode to provide electrical signals for controlling either the photoflash lamp device or the electronic flash device each of which has differently structured connector plugs, having differently arranged electrical contacts, for releasably connecting with the socket assembly.

14 Claims, 6 Drawing Figures

DUAL PURPOSE FLASH/STROBE SOCKET ASSEMBLY FOR A PHOTOGRAPHIC CAMERA

CROSS REFERENCE TO RELATED APPLICATION

This application is related to copending application Ser. No. 889,215, filed Mar. 3, 1978 which is commonly assigned herewith and entitled "Control System for Flash-Illuminated automatic Focusing Camera".

BACKGROUND OF THE INVENTION

1. Field of the Invention

This invention relates generally to photographic camera apparatus and particularly to a dual purpose socket assembly and an electronic flash connector plug for releasably connecting an electronic flash device to a photographic camera of the type which operates in an artificial illumination mode to provide electrical signals for controlling either the electronic flash device or a photoflash lamp device which has a particular structural and electrical contact arrangement.

2. Description of the Prior Art

In the photographic arts, it is well known to provide means by which different types of artificial lighting devices, i.e., photoflash lamp and electronic flash, can be conveniently mated with a camera so long as the camera and the artificial lighting devices are electrically compatible and the electrical requirements of the artificial lighting devices are not different.

For example, conventional electronic flash and photoflash devices which have self-contained power supplies (batteries) and conventional cameras which have shutter operated synchronizing switches are commonly coupled with one another via well-known "PC" connectors, hot shoe and foot arrangements, or bayonet plug and socket arrangements so that closure of the camera's synchronizing switch operates to complete a circuit at an appropriate time to either ignite a photoflash lamp of the photoflash device or fire the tube of the electronic flash device.

Most recently, an automatic type camera, exemplified by Polaroid Corporation's SX-70 Land and Pronto! cameras, has become available with the capability of deriving power from a battery contained within a film cassette and providing a current pulse, synchronized with the camera's shutter opening, to selectively ignite individual photoflash lamps that form part of a linear, multilamp, photoflash array which is rather compact since it does not need a self-contained power supply-the lamp operating power being supplied by the camera. Such multilamp arrays are described, for example, in U.S. Pat. No. 3,598,984 issued to Stanley L. Slomski on Aug. 10, 1971 and entitled "Photoflash Lamp Array".

Sockets for mechanically and electrically coupling such linear photoflash arrays to such automatic cameras are well known and are described, for example, in U.S. Pat. No. 3,748,985 issued to Edison R. Brandt on July 31, 1973 and entitled "Flash Socket Assembly".

Also well known are adapter plugs which fit into such sockets for the purpose of electrically connecting well-known, self-powered type electronic flash devices to such automatic cameras.

Such an adapter plug is described, for example, in U.S. Pat. No. 3,858,227 issued to Seymour Ellin et. al. on Dec. 31, 1974 and entitled "Adapter Apparatus for Flash Firing System". The adapter plug of the Ellin et. al. patent has a blade support configured to fit the Brandt socket. The adapting arrangement operates to utilize the camera's synchronized current pulse as a logic signal to activate an SCR triggering circuit in the self-powered electronic flash device—the SCR, in turn, firing the electronic flash device's flashtube. Thus, the Ellin et. al. disclosure permits such an automatic camera, which was designed for use with a photoflash type device, to be used with another type of artificial lighting device of the self-powered electronic type.

In U.S. Pat. No. 4,064,519 issued to Richard C. Kee on Dec. 20, 1977 and entitled "Regulated Strobe for Camera with Sixth Flash Inhibit", there is described an electronic flash device and a socket and plug arrangement by which the electronic flash device can be directly mechanically and electrically coupled with such an automatic camera in such a way that the electronic flash device can derive its power from the battery of a film cassette used in the camera. Here the entrance slot of the camera's socket, which is of the Brandt type supra, can receive either the connector blade of the disposable multilamp photoflash array of, alternatively, a similarly configured connector blade of the electronic flash device. However, the socket has only a single set of contacts which operate to convert the camera from an ambient exposure mode of operation in response to insertion of either the photoflash or electronic flash device therein and to provide the aforementioned synchronized current pulse to either selectively ignite flashbulbs of the photoflash device or to trigger the electronic flash device. No provision is made via the socket and plug arrangement to supply power to the strobe via the socket contacts. Instead power is supplied from the cassette's battery via a separate jack from the electronic flash device which connects to a separate socket associated with the camera's shutter housing. Thus two steps are required to prepare for illumination with the electronic flash device—insertion of the electronic flash device's plug into the camera's socket and insertion of its power jack into the camera's socket provided for the jack.

Thus, it is a primary object of the present invention to provide a single, dual purpose socket assembly for releasably connecting either a photoflash device or an electronic flash device to a camera of the foregoing type which operates in an artificial illumination mode to provide electrical signals for controlling either the photoflash device or the electronic flash device each of which has differently structured connector plugs, having differently arranged electrical contacts, for releasably connecting to the socket assembly.

Another object of the present invention is to provide a dual purpose socket assembly in combination with an electronic flash connector plug for releasably connecting an electronic flash device to a photographic camera of the foregoing type.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention relates generally to photographic camera apparatus and, more particularly to a dual purpose socket assembly for a photographic camera for releasably connecting either a photoflash lamp device or an electronic flash device to the camera which operates in an artificial illumination mode to provide electrical signals for controlling either the photoflash lamp device or the electronic flash device each of which has differently structured connector plugs, having differently arranged electrical contacts, for releasably connecting with the socket assembly.

The socket assembly comprises means for forming a single socket structured to releasably receive either the connector plug of the photoflash lamp device or the connector plug of the electronic flash device to rigidly support at least a part of each device in a predetermined manner on the camera. Part of the socket is provided with a shape which complements the shape of the photoflash lamp device's connector plug and the shape of the entire socket is configured to complement the shape of the electronic flash device's connector plug so that the photoflash lamp device's plug will fit only its correspondingly shaped part of the socket while the electronic flash device's plug will fit the entire socket. The socket forming means is made of a non-conducting material and is adapted to be mounted on the camera so that either device, when mounted on the camera, is positioned to illuminate a scene to be photographed.

Additionally included in the socket assembly is a first set of electrical contacts mounted on the socket forming means in a predetermined arrangement to engage only those electrical contacts associated with the photoflash lamp device's connector plug to provide an electrically conductive connection between the camera and the photoflash lamp device along which a first set of preselected ones of the camera's electrical signals can be directed to operate the photoflash lamp device, and a second set of contacts, also mounted on the socket forming means in a predetermined arrangement, and which, in combination with selected ones of the first set of contacts, engage only those contacts associated with the electronic flash device's electrical contacts to provide another electrically conductive connection between the camera and the electronic strobe device along which a second set of preselected ones of the camera's electrical signals can be directed to operate the electronic flash device.

Additionally disclosed is a connector plug for use in conjunction with the dual purpose socket assembly for releasably connecting the electronic flash device to the photographic camera.

The connector plug comprises means for forming a male plug member rigidly mounted with the electronic flash device and having a shape complementary to the shape of the entire socket and different from the shape of the photoflash lamp device's connector plug so that the male plug member will fit the entire socket.

Additionally included in the connector plug are a plurality of electrical contacts mounted in a predetermined manner on the male plug member for establishing an electrically conductive connection between the electronic circuits of the electronic flash device and its connector plug, the electronic flash device's electrical contacts being arranged differently from those of the photoflash lamp device and complementary to the socket's second set and selected ones of the socket's first set of contacts which, in combination with the second set of contacts, provide the other electrically conductive connection between the camera and the socket so that, when the connector plug is inserted in the socket, the second set of the camera's electrical signals can be directed to the electronic flash device's electronic circuits.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
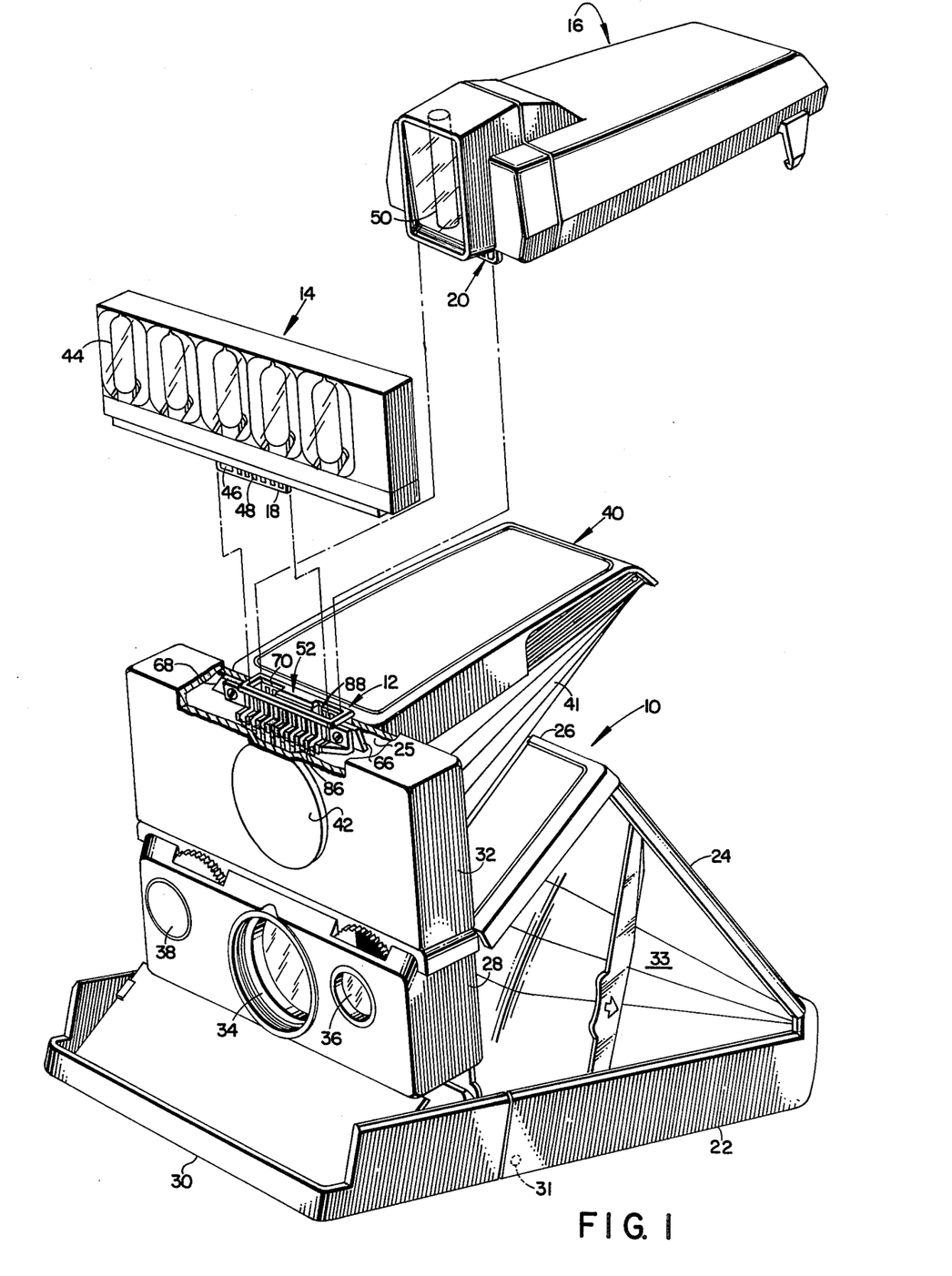
FIG. 1 is a perspective view of a photographic camera, with parts broken away, in which the dual socket assembly of the present invention is incorporated; a linear photoflash lamp device which will fit the socket of the present invention; and an electronic flash device in which the connector plug of the present invention is incorporated.

Referring now to FIG. 1, there is shown an automatic, folding-reflex type camera 10, a well-known multi-lamp, photoflash device 14 having a well-known connector plug 18, and an electronic flash device 16 having a connector plug 20.

Incorporated in the camera 10 is a dual purpose socket assembly 12 which, as will be seen, is structured to releasably connect either the photoflash lamp device 14 or the electronic flash device 16 to the camera 10.

The present invention is particularly concerned with the mechanical and electrical features of both the socket 12 and the connector plug 20 both of whose novel structure and function will be more readily understood by first describing certain characteristics of the camera 10, the photoflash device 14, and the electronic flash device 16.

The camera 10, as is more fully described in U.S. Pat. No. 3,714,879 issued to Edwin H. Land et. al. on Feb. 6, 1973 and entitled "Reflex Camera", is collapsible but is shown in its extended-operative position in FIG. 1 wherein it can be seen to comprise a plurality of pivotally coupled housing members including a base housing member 22, a rear housing member 24, a top housing member 26, and a shutter-lens housing member 28.

An additional housing member 30 is hinged to the base housing member 22 via a pair of pivots 31 (only one shown). The housing member 30 is normally latched in the position shown in FIG. 1 but can be unlatched and swung down to uncover the entrance to a film cassette receiving chamber (not shown) located in the base housing member 22 and adapted in a well-known manner to receive a film cassette (also not shown) of the type which includes a stacked array of self-processable film units under which is positioned a flat, thin battery which is used to provide power to the various electrical components of the camera 10. An example of such a film cassette is described in considerable detail in, for example, U.S. Pat. No. 3,872,487 issued to Nicholas Gold on Mar. 18, 1975 and entitled "Photographic Film Assemblage and Apparatus".

When in its latched position as illustrated in FIG. 1, the housing member 30 functions to retain the film cassette within the base housing section 22 and also positions a pair of processing rollers (not shown) to sequentially transport and simultaneously process, in a well-known manner, exposed film units contained in the film cassette.

The aforementioned housing members in conjunction with a collapsible bellows 33 define a light-tight enclosure which surrounds the optical path of the camera 10.

The housing member 26 supports a collapsible viewing device 40 which includes telescoping blades 41 and a mirror and lens system (not shown) to allow reflex viewing of any photographic scene through an objective taking lens 34 located in the shutter-lens housing member 28.

The objective taking lens 34, which is centrally disposed in and extends through the shutter-lens housing member 28 to the camera's (10) light-tight enclosure, is a well-known, multi-element type which can be focused from approximately 26 cm. to infinity by adjusting the axial air spacing between its elements through a well-known front-element focusing arrangement.

To the right of the objective-taking lens 34 is located an optical element 36 which forms part of a photometer system which operates in a well-known manner to assist in controlling ambient exposure and to the left is located a camera cycle start button 38 commonly referred to as a shutter button.

Within the shutter-lens housing 28 is located an automatic exposure control system (not shown) which provides it with a distinct ambient exposure mode of operation and a distinct artificial illumination mode of operation as is more fully described in U.S. Pat. No. 3,820,128 issued to John P. Burgarella et. al. on June 25, 1974 and entitled "Flash Photographic Control System".

Located above the shutter-lens housing member 28 is an automatic ranging and focusing unit 32, including a centrally disposed transducer 42, which operates in response to actuating the shutter button 38 to automatically determine the range of a scene to be photographed and adjust the objective taking lens 34 to the proper focus. The ranging and focusing unit 32 derives its operating power from the film cassette's battery and is of the type more fully described in pending U.S. patent application Ser. No. 840,802 filed on Oct. 11, 1977 in the name Juerg Muggli for "Ultrasonic Ranging System for a Camera" and pending U.S. patent application Ser. No. 865,852 filed on Dec. 10, 1977 in the name of Edwin K. Shenk and entitled "Lens Movement Actuated Reference and Sequencing Means for Cameras Having Unidirectional Automatic Focusing", both of which are assigned in common herewith.

The photoflash lamp device 14, including its connector plug 18, is a well-known, multi-lamp flash array of the type described in U.S. Pat. No. 3,598,984 issued to Stanley L. Slomski on Aug. 10, 1971 and entitled "Photoflash Lamp Array". Included in the photoflash device 14 are five photoflash lamps 44 in one array (FIG. 1) and five in another (not shown) so that five sequential exposures can be made, each with a different bulb, when the photoflash lamp device 14 is interfaced via the dual purpose socket 12 with a well-known flash selecting and firing system in a manner to be described.

The connector plug 18 is a thin, blade-like element, essentially rectangular in cross-section, which carries on it a linear array of six equally sized and spaced electrical contacts 48 and a wider conducting strip 46, located to the left of the array of contacts 48. When the connector plug 18 is properly interfaced with the camera's flash selecting and firing system, the camera 10 is converted from its ambient exposure mode of operation to its artificial illumination mode of operation during which the photoflash lamps 44 are selectively ignited. A type of flash selecting and firing system which operates in the above described manner is described in considerable detail in U.S. Pat. No. 4,005,449 issued to Seymour Ellin on Jan. 25, 1977 and entitled "Flash Photographic System with Camera Inhibit Feature".

The electronic flash device 14 illustrated in FIG. 1 is of the type more fully described in copending U.S. patent application Ser. No. 889,251 filed on Mar. 3, 1978 in the name of George C. Harrison, commonly assigned herewith, and entitled "Control System for Flash Illuminated Focusing System".

Basically, the electronic flash device 16 as described in the aforementioned application Ser. No. 889,251 is a regulated type which operates to produce a fixed, known quantity of light.

The camera 10 is equipped with a well-known so-called follow-focus exposure control system which, in cooperation with the automatic ranging and focusing unit 32, regulates film exposure while the camera 10 operates in its artificial illumination mode. By selecting a shutter "f-number" in accordance with subject range as determined by the autofocusing unit 32, the light output of the device 16 is selectively controlled for proper exposure.

The follow-focus exposure control system is not shown but is located in the shutter-lens housing member 28 and is of the type described in U.S. Pat. No. 3,750,543 issued to Vaito K. Eloranta et. al. on Aug. 7, 1973 and entitled "Focus Responsive Exposure Control System".

As further described in the application, supra, the electronic flash device 16 is provided with electronic circuits by which it can convert the film cassette's battery voltage to a high direct voltage which it applies to an energy storage capacitor (not shown) connected in parallel with a flash tube 50. Additionally, the electronic flash device 16 includes electronic circuits by which the flash fire pulse generated by the camera's flash selecting and fire circuit can be utilized to operate a trigger circuit (not shown) which in turn fires the flash tube 50 in synchronization with the camera's shutter opening.

Additionally described in the application Ser. No. 889,251, supra, is a charge control system (not shown) for the camera 10 which allows the flashtube capacitor of the device 16 to charge while other camera functions are inactive, and which can disable capacitor charging during automatic focusing and during the film-related operations of exposure and film transport and processing. In this manner, the charge control system of the camera 10 operates to schedule high current operations to occur one at a time so that the film cassette's single battery can power all of its operations. More particularly, the camera's control system, when actuated to initiate an exposure cycle, generates logic signals which, when received by the electronic flash device 16, discontinue charging of the electronic flash device 16.

In addition, the electronic flash device 16, while it is charging, can present a simulated high impedance signal to the camera 10 to prevent its operation by way of a sixth flash inhibit feature which is described in the aforementioned U.S. Pat. No. 4,064,519.

As is readily apparent from the foregoing discussion, the camera 10, when operated in its artificial illumination mode, provides electrical signals for controlling either the photoflash lamp device 14 or the electronic flash device 16. Some of these camera-provided electrical signals, such as the flash fire pulse, are commonly used by both devices while others, such as logic signals from the electronic flash device 16 are not. In addition, the electronic flash device 16 can derive significant power from the film cassette's battery to charge its capacitor while the photoflash lamp device 14 does not have a comparable power requirement. The electrical interfaces between each of these devices and the camera 10 are therefore clearly different even though some of the electrical signals provided by the camera 10 are commonly shared by both devices. Consequently, the electrical connections between these devices and the camera 10 must be different so that one connection is not confused with the other. It is by way of the dual flash socket 12 and the connector plug 20 of this invention that the proper mechanical and electrical connections are made between the camera 10, the photoflash device 14, and the electronic flash device 16.

Figure 2:
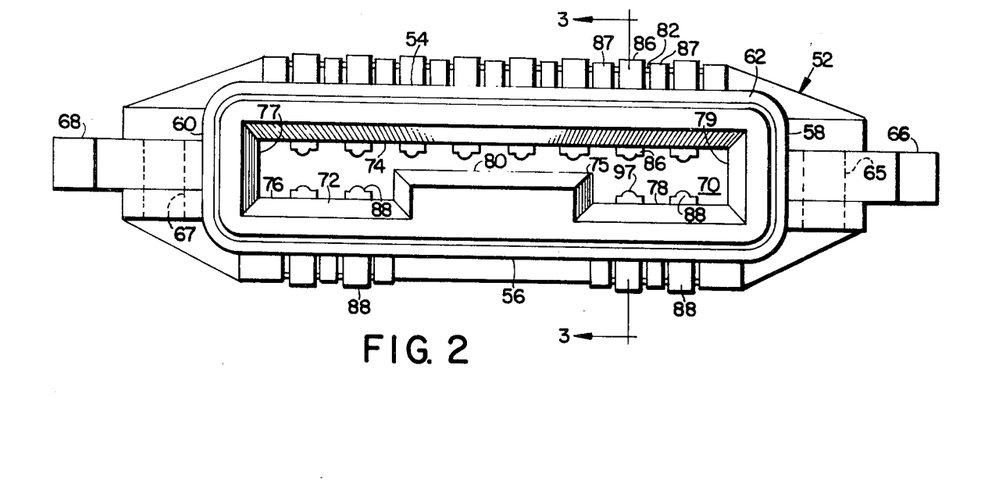
FIG. 2 is an enlarged top plan view of the socket of the present invention.
Figure 3:
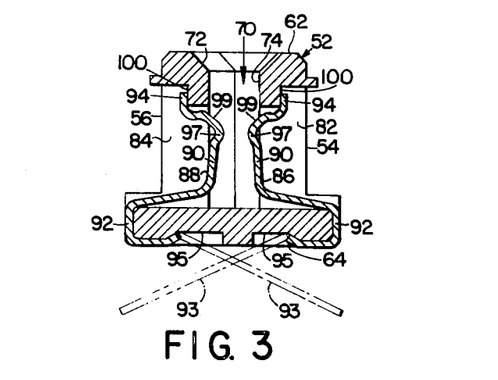
FIG. 3 is a cross-sectional view taken generally along line 3—3 of FIG. 2.
Figure 4:
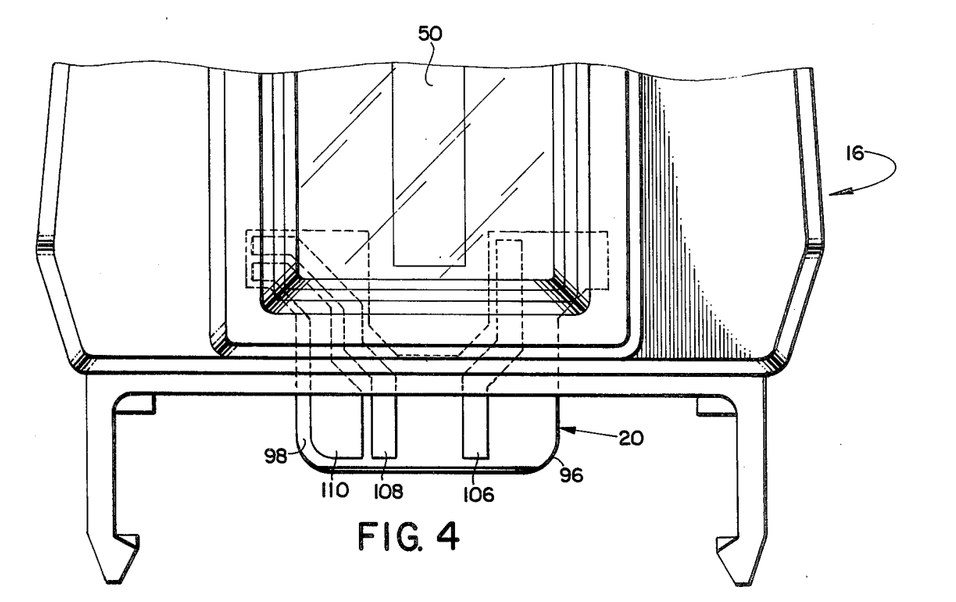
FIG. 4 is an enlarged, fragmentary front-elevational view of the electronic flash device of FIG. 1.
Figure 5:
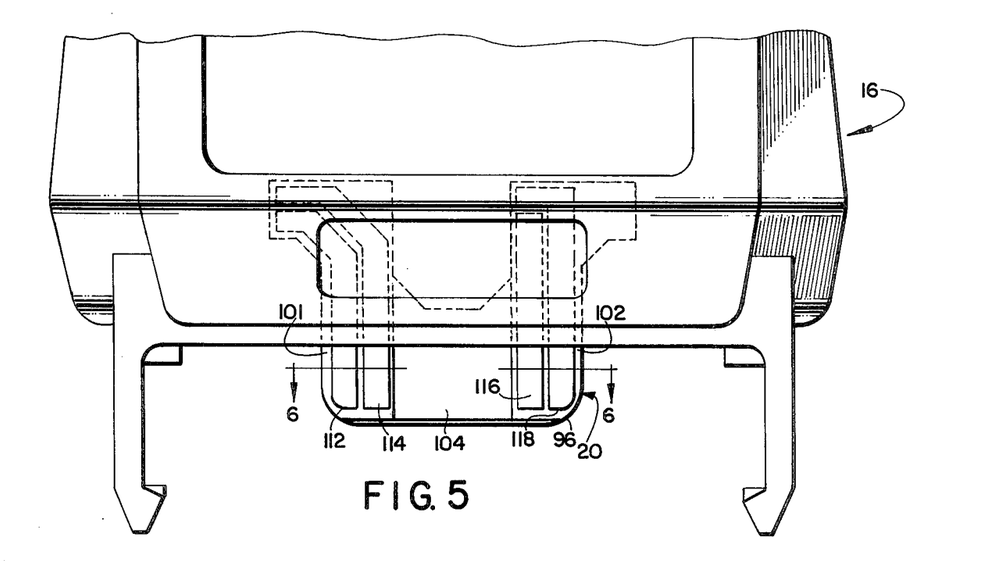
FIG. 5 is an enlarged, fragmentary, rear-elevational view of the electronic flash device of FIG. 1.

Reference is now made to FIGS. 1, 2 and 3 wherein it can be seen that the socket 12 comprises socket forming means in the form of a generally rectangular parallelepiped-shaped structural member 52. The structural member 52 is preferably made of a non-conducting material and includes a forward wall 54, a rear wall 56 spaced from the forward wall 54, and a pair of spaced apart side walls, 58 and 60, connecting the forward wall 54 and the rear wall 56. Additionally included in the structural member 52 are an elongated top wall 62 and an elongated bottom wall 64 spaced from the top wall 62. The aforementioned walls of the structural member 52 cooperate to define a thin, generally elongated slot 70 centrally disposed in the top wall 62 and extending toward the bottom wall 64 to a given depth. The entrance to the slot 70, located in the top wall 62, is provided with a beveled peripheral edge 72 to ease insertion of the connecting plugs, 18 and 20, of the photoflash lamp device 14 and the electronic flash device 16, respectively.

As best shown in FIG. 2, the slot 70 comprises two spaced apart elongated wall surfaces of given length including a forward substantially straight surface 74 and a rear broken wall surface 75. The wall surfaces, 74 and 75, are joined at their ends by two side wall surfaces, 77 and 79, of given width.

The broken wall surface 75 comprises two straight end surfaces, 76 and 78, spaced away from the elongated straight surface 74 by the given width of the side walls, 77 and 79, and a central straight surface 80 spaced from the elongated straight surface 74 by a distance less than the given width of the side wall surfaces 77 and 79.

Figure 6:
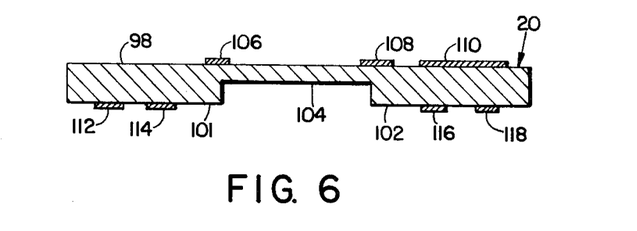
FIG. 6 is a cross-sectional view taken along line 6—6 of FIG. 5.

Configured in the foregoing manner, the slot 70 is provided with a cross-sectional shape resembling that of a shallow, elongated "U". Part of the slot 70, defined by the straight wall surface 74 and the central straight wall surface 80, is configured to releasably receive the connector plug 18, which, as previously indicated, is essentially rectangular in cross-section. The entire slot 70 is configured to releasably receive the connector plug 20 which, as can be seen in FIG. 6, is provided with a "U" shape which complements that of the slot 70.

In this manner, part of the slot 70 is provided with a shape which complements the shape of the photoflash lamp device's connector plug 18 while the shape of the entire slot 70 is configured to complement the shape of the flash device's connector plug 20.

Extending outwardly from the center of each side wall, 58 and 60, are a pair of wall sections, 66 and 68, respectively, each of which has a mounting hole 65 and 67, respectively, which provide a means by which the structural member 52 can be mounted to the camera 10. As shown in FIG. 1, mounting can be accomplished by using conventional screw fasteners or the like to attach the socket 12 to a rear wall 25 of the automatic ranging and focusing unit 32 so that, when either artificial lighting device, 14 or 16, is mounted on the camera 10, it will be positioned to illuminate a scene to be photographed.

For a more detailed description of how the electronic flash device 16 is further releasably attached too the camera 10, reference may be had to pending U.S. patent application Ser. No. 884,471 filed on Mar. 20, 1978 in the name of Fred M. Finnemore et. al. for "Strobe-Light Apparatus for Use with Photographic Camera".

Referring now to FIG. 2 and particularly to FIG. 3, it can be seen that the forward wall 54 is provided with a plurality (eight) of electrical contact receiving apertures 82 each of which extends through the forward wall 54 terminating at the slot's straight wall surface 74. Each aperture 82 is configured to receive a corresponding one of a first set of eight complementary configured electrical contacts generally designated at 86.

Interdigitated with the contacts 86 are spacing sections 87 (FIG. 2) which maintain the contacts 86 in parallel relationship and prevents them from moving into electrical engagement with one another.

Each of the contacts 86 are provided with a base portion 93 (shown in phantom) for connection with leads on a flexible circuit (not shown), a generally "U" shaped section 92 which "snaps" around a portion of the bottom wall 64 and has a portion which is engaged in a corresponding complementary configured recess 95 therein, an exit ramp portion 90, a dimpled contact portion 97, an entrance ramp portion 99, and a reverse bend portion which terminates in an end portion 94 which is loaded against a corresponding portion 100 of each aperture 82.

The entrance and exit ramp portions, 99 and 90, respectively, insure smooth insertion and withdrawal of the connector 18 while the dimpled portions 97 of each contact 86 apply a normal loading force on the six correspondingly spaced contacts 46 and the conducting strip 48 of the connector plug 18.

Likewise, the rear wall 56 of the socket 12 is provided with a second set of four contacts, generally designated at 88. Two each of the contacts 88 are disposed in the straight end surfaces, 76 and 78, of the broken wall surface 75. Each of the contacts 88 is identical in structure to the contacts 86 and also extend through corresponding apertures 84 (FIG. 3) each of which is identical to the apertures 82.

As can best be seen in FIG. 2, the contacts 86 and 88 are spaced apart from each other, some of each oppositely facing one another. Also each contact portion 97 of each contact 88 does not extend toward the contacts 86 beyond a line coincident with the central wall surface 80 of the broken wall surface 75. In this manner, the contacts of the photoflash device's connector plug 18 which are not engaged with the socket's eight contacts 86 cannot mate with any of the four contacts 88 when the connecting plug 18 is inserted in its complementary shaped part of the slot 70.

All of the electrical contacts of the socket 12 are preferably composed of a spring material having a high electrical conductivity and high tensile strength such as certain berryllium copper alloys. Also a nickel silver coating is preferably applied to each contact to minimize contact resistance.

In the foregoing manner, the socket 12 is provided with a first set of eight electrical contacts 86 mounted thereon in a predetermined arrangement to engage only those electrical contacts associated with the photoflash lamp device's connector plug 18 to provide an electrically conductive connection between the camera 10 and the photoflash lamp device 14 along which a first set of preselected ones of the camera's electrical signals can be directed to operate the photoflash lamp device 14 and a second set of four contacts 88 also mounted on the socket 12 in a predetermined arrangement and which, as will be seen more clearly in the description to follow, in combination with selected ones of the first set of contacts 86, engage only those contacts associated with contacts on the electronic flash device plug 20 to provide another electrically conductive connection between the camera 10 and the electronic flash device 14 along which a second set of preselected ones of the camera's electrical signals can be directed to operate the electronic flash device 14.

Referring now to FIGS. 6, 7 and 8, it can be seen that the electronic flash device's connector plug 20 comprises a male plug member 96 which is rigidly attached in a well-known manner to the electronic flash device 14. The member 96 is a thin, elongated, blade-like element whose insertion end has the general shape of a rectangular parallelepiped (see FIG. 6) whose shape is complementary to the shape of the slot 70 (FIG. 2). The plug member 96 depends from the electronic flash device 16 to a given length (less than the depth of the slot 70) and comprises two spaced apart elongated surfaces of given length—a straight surface 98 and a broken surface formed of two straight end surfaces 101 and 102 which are spaced from the straight surface 98 by a given distance and a central straight surface 104 spaced from the straight surface 96 by a distance less than that separating the end surfaces, 101 and 102, from the straight surface 98.

In this manner the insertion end of the plug member 96 is provided with a cross-sectional shape in the form of an elongated, shallow "U" whose shape is complementary to that of the slot 70.

Arranged in a predetermined manner on the straight surface 98 are three electrical contacts, 106, 108 and 110; on the straight end surface 101 a pair of contacts, 112 and 114; and on the straight end surface 102 another pair of contacts, 116 and 118.

The purpose of the electrical contacts 106 through 118 is to establish an electrically conductive path between the electronic circuits of the electronic flash device 14 and its connector plug 20. By comparing the contact arrangement of the photoflash lamp device 14 (FIG. 1) with the contact arrangement on the electronic strobe device 16 (FIG. 6), it is clear that the contact arrangements on the connector plugs of these devices is different. The contact arrangement of the electronic flash device's plug 20 is complementary to the socket's (12) second set of four contacts 88 and selected ones of the socket's first set of eight contacts 86 which, in combination with the socket's second set of four contacts 88, provide the other electrically conductive connection between the camera 10 and the socket 12 so that, when the connector plug 20 is inserted in the socket 12, the second set of the camera's electrical signals can be directed to the electronic flash device's electronic circuits. In this manner the second set of contacts 88 can provide flash charging power from the camera 10 and logic inhibit signals which operate to inhibit the flash charging operation during periods when the camera is consuming battery power.

From the foregoing, it can be appreciated that the dual purpose socket 12 in combination with the electronic flash device's connector plug 20 provide a means for releasably connecting the electronic flash device 14 to the camera 10.

Certain changes may be made in the above-described embodiment without departing from the scope of the invention, and those skilled in the art may make other changes according to the teachings of the invention. Therefore, it is intended that all matter contained in the above description or shown in the accompanying drawings shall be interpreted as illustrative and not in a limiting sense.

What is claimed is:

1. A dual purpose socket assembly for a camera for releasably connecting to the camera either a multilamp photoflash device or an electronic flash device wherein the camera is of the type that includes means for converting from an ambient exposure mode of operation to an artifical illumination exposure mode of operation in response to receipt of either device and, while in the artificial illumination exposure mode of operation, for providing a first set of electrical signals to the photoflash device by which the operation of the photoflash device can be controlled in a predetermined manner in conjunction with the camera operation and for providing a second set of electrical signals, which include selected signals from the first set, by which the electronic flash device also can be controlled in a predetermined manner in conjunction with the camera operation wherein the photoflash device is of the type having an array of lamps arranged on oppositely facing sides thereof and includes a two-sided, elongated, thin-bladed plug with a set of electrical contacts corresponding to each array of lamps on each side of the plug such that only one side of the photoflash device can be utilized at a time and wherein the electronic flash device is of the type which has an elongated blade-like plug of different configuration than the photoflash device plug and has arranged on both sides thereof electrical contacts which on one side correspond directly to the spatial arrangement of the contacts on each side of the photoflash plug and are simultaneously utilized to operate the electronic flash device, said socket assembly comprising:

electrically nonconducting means for forming an open ended, single cavity socket structured to releasably receive either the connector plug of the photoflash lamp device or the connector plug of the electronic flash device along a common insertion path, to rigidly hold either plug, and adapted to be mounted on the camera so that either device, when connected with the camera, is positioned to illuminate a scene to be photographed, said cavity of said socket being defined by a series of spaced apart interconnecting wall sections two of which are arranged so that said open end thereof is a generally elongated slot extending to a given depth;

a first set of electrical contacts mounted on said socket forming means along one of said elongated wall sections in a spatial arrangement complementary to the spatial arrangement of the contacts on either side of the photoflash device plug and to all of the contacts on the side of the electronic flash device plug which has a contact spatial arrangement corresponding to that of the photoflash plug;

a second set of electrical contacts mounted on said socket forming means along said other elongated wall section in a spatial arrangement complementary to the spatial arrangement of the contacts on the other side of the electronic flash device plug, said other elongated wall being generally spaced from and opposite said one elongated wall so that said first set of contacts face said second set of contacts; and means positioned in said cavity and structured for guiding the photoflash device plug into only a part of said cavity so that the contacts on one side of the photoflash device plug engage only said first set of contacts to provide an electrically conductive connection between the camera and the photoflash device along which the first set of camera electrical signals for controlling the photoflash device can be directed to control the photoflash device while keeping the contacts on the opposite side of the photoflash device plug from engaging said second set of socket contacts and for allowing the electronic flash device plug to fit substantially said entire cavity so that the contacts on both sides of the electronic flash device can simultaneously engage said second set of contacts and selected ones of said first set of contacts to provide an electrically conductive connection between the camera and the electronic flash device along which the second set of camera electrical signals for controlling the electronic flash device can be directed to control the electronic flash device.

2. The assembly of claim 1 wherein said socket forming means has the general shape of a rectangular parallelepiped having spaced apart elongated top and bottom wall sections wherein said elongated slot is centrally disposed in said top wall section and extends toward said bottom wall section to said given depth, said slot comprising said two spaced apart elongated wall sections and two side wall sections of given width joined to said elongated wall sections at their respective ends, said one elongated wall section being substantially straight and said other elongated wall section comprising two straight end sections spaced away from said straight elongated wall section by said given width and a central straight section spaced from said straight elongated wall section by a distance less than said given width to provide said slot with a general "U"-shape.

3. The assembly of claim 2 wherein said first set of electrical contacts is arranged as a linear array along said straight elongated wall section of said slot while the contacts of said second set of electrical contacts are arranged linearly along both of said straight end sections of said other elongated wall of said slot so that said electrical contacts of said second set face, in spaced apart relationship, predetermined ones of said first set of electrical contacts.

4. The assembly of claim 3 wherein said straight central section of said other elongated wall and said straight elongated wall, in combination, define said part of said socket for receiving the photoflash device plug.

5. A connector plug for use in conjunction with a dual purpose socket assembly for releasably connecting an electronic flash device to a camera wherein the camera is of the type that includes means for converting from an ambient exposure mode of operation to an artificial illumination exposure mode of operation in response to receipt of the electronic flash device or a multilamp photoflash device and, while in the artificial illumination exposure mode of operation, for providing a first set of electrical signals to the photoflash device by which the operation of the photoflash device can be controlled in a predetermined manner in conjunction with the camera operation and for providing a second set of electrical signals, which include selected signals from the first set, by which the electronic flash device can also be controlled in a predetermined manner in conjunction with the camera operation, wherein the photoflash device is of the type having an array of lamps arranged on oppositely facing sides thereof and includes a two-sided, elongated, thin-bladed plug with a set of electrical contacts corresponding to each array of lamps on each side of the plug such that only one side of the photoflash device can be utilized at a time, and wherein the dual purpose socket assembly is of the type which includes: an open-ended single cavity socket which cavity is defined by a series of spaced apart interconnecting wall sections two of which are arranged so that the open end thereof is a generally elongated slot of given depth; a first set of electrical contacts mounted along one of the cavity elongated wall sections in a spatial arrangement complementary to the spatial arrangement of the contacts on either side of the photoflash device plug; a second set of contacts mounted on the cavity other elongated wall section in a predetermined spatial arrangement to face the first set of cavity contacts; and means positioned in the cavity and structured for guiding the photoflash device plug into only part of the cavity so that the contacts on one side of the photoflash device plug engage only the first set of cavity contacts to provide an electrically conductive connection between the camera and the photoflash device along which the first set of camera signals can be directed to control the photoflash device while keeping the contacts on the opposite side of the photoflash device plug from engaging the second set of cavity contacts, said connector plug comprising:

nonconductive means for forming a thin elongated, blade-like, male plug member connected with respect to the electronic flash device, said plug member being formed of a series of interconnecting wall surfaces two of which are elongated to complement respective elongated wall sections of the cavity, said series of interconnecting wall surfaces being further configured and arranged with respect to one another to complement the shape of the means in the cavity for guiding the photoflash device plug into only a part of the cavity such that said plug member fits the entire socket cavity;

a first set of electrical contacts mounted on one said male plug member elongated wall surface in a spatial arrangement corresponding directly to the spatial arrangement of the socket first set of contacts; and a second set of electrical contacts mounted on said male plug member other elongated wall surface in a spatial arrangement corresponding directly to the spatial arrangement of the socket second set of electrical contacts, said connecting plug being configured and arranged in the foregoing manner so that when plugged into the socket cavity, said first and said second sets of contacts thereof engage corresponding ones of the socket contacts to provide an electrically conductive path between the camera and the socket so that the camera second set of electrical signals can be directed to the electronic strobe device to control it.

6. The connector plug of claim 5 wherein said male plug member has the general shape of a rectangular parallelepiped, depending from the electronic strobe device to a given length and comprises two side wall surfaces of given depth joined to said elongated wall surfaces at their respective ends, said one elongated wall surfaces is substantially straight and said other elongated wall surfaces comprises two straight end surfaces spaced away from said straight elongated wall surface by said given depth and a central straight surface spaced from said straight elongated wall surface by a distance less than said given depth to provide said plug member with a cross-sectional shape in the form of a shallow "U".

7. The connector plug of claim 6 wherein said first set of contacts thereof are arranged on said straight elongated wall section thereof as a linear array to contact complementary arranged selected ones of the first set of the socket contacts and said second set of contacts are arranged linearly on both of said straight end sections thereof to engage in complementary fashion said second set of the socket contacts.

8. A dual purpose, single cavity, socket assembly in combination with an electronic flash connector plug for a camera for releasably connecting to the camera an electronic flash device wherein the camera is of the type that includes means for converting from an ambient exposure mode of operation to an artificial illumination exposure mode of operation in response to receipt of either the electronic flash device or a multilamp photoflash device and, while in the artificial illumination exposure mode of operation, for providing a first set of electrical signals to the photoflash device by which the operation of the photoflash device can be controlled in a predetermined manner in conjunction with the camera operation and for providing a second set of electrical signals, which include selected signals from the first set, by which the electronic flash device also can be controlled in a predetermined manner in conjunction with the camera operation and wherein the photoflash device is of the type having an array of lamps arranged on oppositely facing sides thereof and includes a two-sided, elongated, thin-bladed plug with a set of electrical contacts corresponding to each array of lamps on each side of the plug such that only one side of the photoflash device can be utilized at a time, said combination comprising:

nonconductive means for forming a thin elongated, blade-like, male plug member connected with respect to the electronic flash device, said plug member being formed of a series of interconnecting wall surfaces two of which are elongated, said series of interconnecting wall surfaces being configured and arranged with respect to one another to complement the shape of said socket single cavity such that said plug member fits the entire socket cavity;

a first set of electrical contacts mounted on one of said male plug member elongated wall surfaces in a spatial arrangement corresponding directly to the spatial arrangement of the contacts on either side of the photoflash device plug;

a second set of electrical contacts mounted on said male plug member other elongated wall surface in a predetermined spatial arrangement;

electrically nonconducting means for forming said single cavity socket and structured to provide said socket cavity with an open end structured to releasably receive either the connector plug of the photoflash lamp device or the connector plug of the electronic flash device along a common insertion path, to rigidly hold either plug, and adapted to be mounted on the camera so that either device, when connected with the camera, is positioned to illuminate a scene to be photographed, said cavity of said socket being defined by a series of spaced apart interconnecting wall sections two of which are arranged so that said open end thereof is a generally elongated slot extending to a given depth and shaped complementary to said electronic flash device plug;

a first set of electrical contracts mounted on said socket forming means along one of said socket elongated wall sections in a spatial arrangement complementary to the spatial arrangement of the contacts on either side of the photoflash device plug and to all of the contacts on said side of said electronic flash device plug which has a contact spatial arrangement corresponding to that on the photoflash plug;

a second set of electrical contacts mounted on said socket forming means along said other elongated wall section in a spatial arrangement complementary to said predetermined spatial arrangement of said second set of contacts on said other elongated wall surface of said electronic flash device plug, said cavity one elongated wall section being generally spaced from and opposite said cavity other elongated wall section so that said first set of cavity contacts face said second set of cavity contacts; and means positioned in said cavity and structured for guiding the photoflash device plug into only a part of said cavity so that the contacts on one side of the photoflash device plug engage only said first set of cavity contacts to provide an electrically conductive connection between the camera and the photoflash device along which the first set of camera electrical signals for controlling the photoflash device can be directed to control the photoflash device while keeping the contacts on the other side of the photoflash device plug from engaging said second set of socket contacts and for allowing the electronic flash device plug to fit substantially said entire cavity so that the contacts on both sides of said electronic flash device plug can simultaneously engage said second set of cavity contacts and selected ones of said first set of cavity contacts to provide an electrically conductive connection between the camera and the electronic flash device along which the second set of camera electrical signals for controlling the electronic flash device can be directed to control the electronic flash device.

9. The combination of claim 8 wherein said socket forming means has the general shape of a rectangular parallelepiped having spaced apart elongated top and bottom wall sections wherein said elongated slot is centrally disposed in said top wall section and extends toward said bottom wall section to said given depth, said slot comprising said two spaced apart elongated wall sections and two side wall sections of given width joined to said elongated wall sections at their respective ends, said one elongated wall section being substantially straight and said other elongated wall section comprising two straight end sections spaced away from said straight elongated wall section by said given width and a central straight section spaced from said straight elongated wall section by a distance less than said given width to provide said slot with a general "U" shape.

10. The combination of claim 9 wherein said first set of socket electrical contacts is arranged as a linear array along said straight elongated wall section of said slot while the contacts of said second set of socket electrical contacts are arranged linearly along both of said straight end sections of said other elongated wall section of said slot so that said electrical contacts of said second set face, in spaced apart relationship, predetermined ones of said first set of electrical contacts.

11. The combination of claim 10 wherein said straight central section of said other elongated wall section and said straight elongated wall section, in combination, define said part of said socket for receiving the photoflash device plug.

12. The combination of claims 8 or 10 wherein said male plug member has the general shape of a rectangular parallelepiped, depending from the electronic strobe device to a given length and comprises two side wall surfaces of given depth joined to said elongated wall surfaces at their respective ends, and wherein said one elongated wall surface is substantially straight and said other elongated wall surface comprises two straight end surfaces spaced away from said straight elongated wall surface by said given depth and a central straight surface spaced from said straight elongated wall surface by a distance less than said given depth to provide said plug member with a cross-sectional shape in the form of a shallow "U".

13. The combination of claim 12 wherein said first set of said electronic flash device plug contacts are arranged as a linear array on said straight elongated wall surface thereof to contact complementary arranged selected ones of said first set of said socket contacts and said second set of said electronic flash device plug contacts are arranged linearly on both of said straight end surfaces of said electronic flash device plug to engage in complementary fashion said second set of said socket contacts.

14. The socket assembly of claim 1 wherein said last stated means is integrally formed with said other elongated wall section on which are arranged said second set of contacts.

* * * * *